US009584840B2

(12) United States Patent
Tanner et al.

(10) Patent No.: US 9,584,840 B2
(45) Date of Patent: Feb. 28, 2017

(54) DETERMINATION OF ADVERTISEMENT IMPACT

(75) Inventors: Rudolf Tanner, Azmoos (CH); John M. Gee, Clark's Summit, PA (US)

(73) Assignee: OpenTV, Inc., San Francisco, CA (US)

(*) Notice: Subject to any disclaimer, the term of this patent is extended or adjusted under 35 U.S.C. 154(b) by 313 days.

(21) Appl. No.: 14/004,126

(22) PCT Filed: Feb. 28, 2012

(86) PCT No.: PCT/US2012/026899
§ 371 (c)(1),
(2), (4) Date: Nov. 19, 2013

(87) PCT Pub. No.: WO2012/121928
PCT Pub. Date: Sep. 13, 2012

(65) Prior Publication Data
US 2014/0082648 A1  Mar. 20, 2014

Related U.S. Application Data

(60) Provisional application No. 61/451,136, filed on Mar. 10, 2011.

(51) Int. Cl.
*H04N 7/16* (2011.01)
*H04H 9/00* (2006.01)
(Continued)

(52) U.S. Cl.
CPC ....... *H04N 21/2407* (2013.01); *G06Q 20/145* (2013.01); *G06Q 30/0242* (2013.01);
(Continued)

(58) Field of Classification Search
None
See application file for complete search history.

(56) References Cited

U.S. PATENT DOCUMENTS 4,677,466 A  6/1987 Lert, Jr. et al.
6,324,519 B1  11/2001 Eldering
(Continued)

FOREIGN PATENT DOCUMENTS

CN  102110265 A  6/2011
JP  2004186751  5/2007
(Continued)

OTHER PUBLICATIONS

"International Application Serial No. PCT/US2012/026899, International Preliminary Report on Patentability mailed Sep. 19, 2013", 6 pgs.
(Continued)

*Primary Examiner* — Joshua Taylor
*Assistant Examiner* — Terrika Peterson
(74) *Attorney, Agent, or Firm* — Schwegman Lundberg & Woessner, P.A.

(57) ABSTRACT

Media content may include one or more advertisements for a product or a company, and such an advertisement may display a visual object (e.g., a logo) of an advertiser. An advertisement impact machine accesses media content, where the media content includes a frame within which the visual object is depicted. The advertisement impact machine accesses a viewer count that represents a number of viewers of the media content. The advertisement impact machine determines a duration during which the visual object is presented within the media content. The advertisement impact machine determines an impact factor based on the duration and on the viewer count. The impact factor may then be provided by the advertisement impact machine as a numerical score indicating a degree of effectiveness of an advertisement that includes the visual object within the media content.

15 Claims, 9 Drawing Sheets

(51) Int. Cl.
 *G06Q 30/00* (2012.01)
 *H04N 7/10* (2006.01)
 *G06F 3/00* (2006.01)
 *H04N 5/445* (2011.01)
 *H04N 21/24* (2011.01)
 *G06Q 20/14* (2012.01)
 *G06Q 30/02* (2012.01)
 *H04H 20/14* (2008.01)
 *H04N 21/2547* (2011.01)
 *H04N 21/442* (2011.01)
 *H04N 21/81* (2011.01)
 *H04N 21/234* (2011.01)
 *H04N 21/25* (2011.01)
 *H04N 21/258* (2011.01)
 *H04N 21/2668* (2011.01)

(52) U.S. Cl.
 CPC ...... *H04H 20/14* (2013.01); *H04N 21/23418* (2013.01); *H04N 21/23424* (2013.01); *H04N 21/251* (2013.01); *H04N 21/2547* (2013.01); *H04N 21/25883* (2013.01); *H04N 21/2668* (2013.01); *H04N 21/44222* (2013.01); *H04N 21/812* (2013.01)

(56) References Cited

U.S. PATENT DOCUMENTS

| | | |
|---|---|---|
| 6,704,930 B1 | 3/2004 | Eldering et al. |
| 6,978,470 B2 | 12/2005 | Swix et al. |
| 7,546,619 B2 | 6/2009 | Anderson et al. |
| 7,698,165 B1 | 4/2010 | Tawakol et al. |
| 7,912,217 B2 | 3/2011 | Baugher et al. |
| 7,970,645 B2 | 6/2011 | Gordon et al. |
| 7,984,462 B2 | 7/2011 | Deng |
| 8,010,691 B2 | 8/2011 | Kollmansberger et al. |
| 8,069,464 B2 | 11/2011 | Pickens et al. |
| 8,082,355 B1 | 12/2011 | Weber et al. |
| 8,099,327 B2 | 1/2012 | Steelberg et al. |
| 8,745,647 B1 * | 6/2014 | Shin et al. ............ 725/9 |
| 2002/0059633 A1 | 5/2002 | Harkness et al. |
| 2006/0075420 A1 * | 4/2006 | Ludvig et al. ............ 725/9 |
| 2006/0111968 A1 * | 5/2006 | Cline et al. ............ 705/14 |
| 2007/0157231 A1 | 7/2007 | Eldering et al. |
| 2008/0250447 A1 * | 10/2008 | Rowe et al. ............ 725/32 |

FOREIGN PATENT DOCUMENTS

| | | |
|---|---|---|
| WO | WO-2008109608 | 9/2008 |
| WO | WO-2012121928 A1 | 9/2012 |

OTHER PUBLICATIONS

"Cisco Media Processor for Digital Media Advertisements", accessed Feb. 29, 2012, [Online]. Retrieved from the Internet: <URL: http://www.cisco.com/en/US/prod/collateral/video/ps11488/ps11791/ps...solution_overview_c22-675927_ps11804_Product_Solution_Overview.htm>, (Jun. 2011), 3 pgs.

"In-Stream Ad Insertion: It Changes Everything", http://www.mdialog.com/dynamic-ad.html (accessed Feb. 29, 2012), (2012), 2 pgs.

"International Application Serial No. PCT/US2012/026899, International Search Report mailed Jun. 4, 2012", 4 pgs.

"International Application Serial No. PCT/US2012/026899, Written Opinion mailed Jun. 4, 2012", 4 pgs.

"Chinese Application Serial No. 201280022457.1, Office Action mailed Dec. 3, 2015", 11 pgs.

* cited by examiner

DETERMINATION OF ADVERTISEMENT IMPACT

RELATED APPLICATION

This application claims the priority benefit of International Application No. PCT/US2012/026899, filed Feb. 28, 2012, and published on Sep. 13, 2012 as WO 2012/121928 A1, which claims the benefit of priority of U.S. Provisional Patent Application No. 61/451,136, filed Mar. 10, 2011, which applications and publication are incorporated herein by reference in their entirety.

TECHNICAL FIELD

The subject matter disclosed herein generally relates to data processing. Specifically, the present disclosure addresses systems and methods that involve measuring advertisement impact.

BACKGROUND

Commercials broadcast over a network may be sold on a per-second basis. For example, a machine may automatically monitor video content and count the appearance of every company logo within the video content. Moreover, such a machine may also measure the duration that an advertiser's logo is visible within the video content. Accordingly, an advertiser may be charged a fee for each second that the advertiser's logo appears in the video content (e.g., to a content consumer, such as a viewer of the video content).

BRIEF DESCRIPTION OF THE DRAWINGS

Some embodiments are illustrated by way of example and not limitation in the figures of the accompanying drawings.

DETAILED DESCRIPTION

Figure 1:
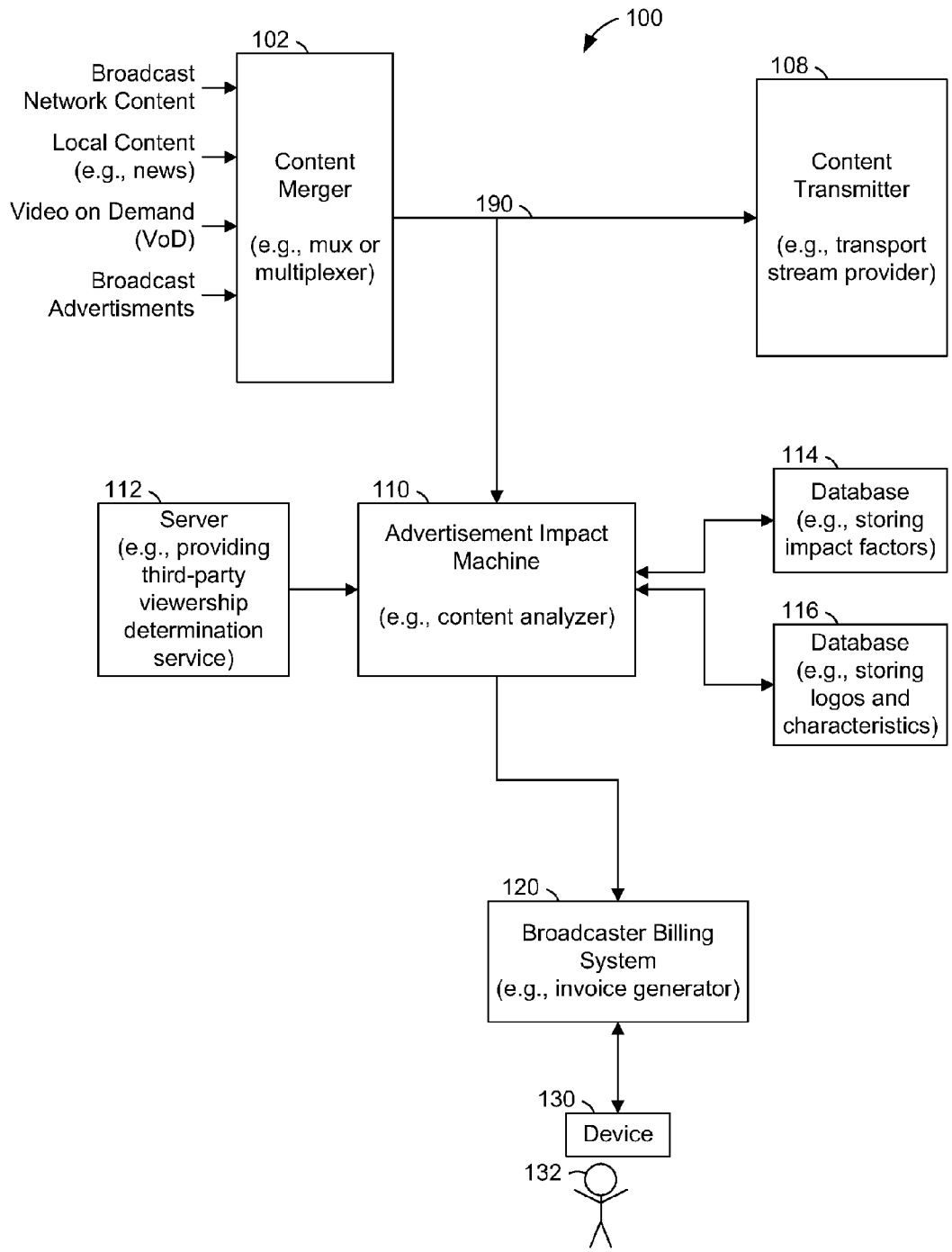
FIG. 1-2 are network diagrams illustrating a network environment suitable for determination of advertisement impact, according to some example embodiments.

Example methods and systems are directed to determination of advertisement impact. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Media content may include one or more advertisements for a product or a company, and such an advertisement may display a logo of an advertiser (e.g., a company or business that sponsors the advertisement). For example, an advertisement may take the form of a commercial (e.g., a commercial video) inserted into the media content (e.g., interrupting the media content), where the commercial includes a presentation of the advertiser's logo. As another example, an advertisement may take the form of product placement within the media content (e.g., without interrupting the media content), where the media content itself may include a presentation of the advertiser's logo (e.g., on an object shown in the media content). Within the media content, a presentation of an advertiser's logo has a duration, which may be determined (e.g., measured, calculated, estimated, or inferred) as a period of time (e.g., 2 seconds, 15 seconds, 22 seconds, etc.) during which the logo is presented (e.g., visible to a viewer). Such a presentation of a logo may be conceptualized as spanning a number of frames (e.g., video frames) within the media content. As used herein, a "logo" is an example of a visual object that corresponds to (e.g., identifies, references, or indicates) the advertiser and that may be included in one or more frames of media content, such that the visual object is presented to one or more viewers of the media content. Examples of visual objects include a logo, an image, an icon, a graphic design, a symbol, a trademark, a servicemark, a name (e.g., a stylized name) of an advertiser, a name (e.g., a stylized name) of a product, a brand, or any suitable combination thereof. For clarity, the discussion herein focuses on advertisements in which a logo is presented in media content. The systems and methods discussed herein, however, apply equally well to all examples of a visual object that corresponds to an advertiser.

An advertisement impact machine is configured (e.g., by software) to access the media content, where the media content includes a frame (e.g., a first frame) within which a logo of an advertiser is depicted. The advertisement impact machine may access a viewer count that represents a number of viewers of the media content. For example, the viewer count may represent a numerical size of a group of viewers of the media content (e.g., a single-demographic group, a multi-demographic group, a single-platform group, a multi-platform group, etc.). The advertisement impact machine may determine (e.g., measure, identify, or calculate) a duration of the presentation of the logo within the media content. This may be performed by identifying the frame (e.g., the first frame) within which the logo is depicted and identifying a subsequent frame (e.g., a second frame) that is devoid of the logo. For example, the advertisement impact machine may identify the frame in which the logo first appears as an initial frame in the presentation of the logo, and then identify the nearest subsequent frame in which the logo is absent. The advertisement impact machine may then identify the previous frame (e.g., immediately preceding this nearest subsequent frame in which the logo is absent) as a final frame in the presentation of the logo. Accordingly, the duration of the presentation of the logo may be determined by the advertisement impact machine (e.g., in seconds, minutes, or frames).

Having determined the duration of the presentation of the logo, the advertisement impact machine may determine an impact factor as a quantification (e.g., measurement or calculation) of advertisement impact for the presentation of the logo. In particular, the advertisement impact machine may determine the impact factor based on the duration of the logo's presentation and the viewer count previously accessed. For example, the impact factor may be determined based on a multiplication of the duration to the viewer count (e.g., impact factor=duration×viewer count).

In some example embodiments, the multiplication includes multiplying together the duration, the viewer count, and a boost factor that quantifies increase in popularity of the media content (e.g., impact factor=duration×viewer count×boost factor). The boost factor may correspond to an increase in the media content's popularity due to an event (e.g., resulting from a significant national or global event). In certain example embodiments, the determining of the impact factor includes multiplying together the duration of the presentation, the viewer count, and a profile weight (e.g., classification weight) that corresponds to a viewer profile (e.g., viewer classification) characterizing (e.g., classifying) the group of viewers quantified by the viewer count (e.g., impact factor=duration×viewer count×classification weight). For example, the profile weight and the viewer profile may correspond to (e.g., specify or indicate) an attribute (e.g., a demographic attribute) shared in common among the group of viewers. Examples of such an attribute include gender (e.g., male or female), subscription type (e.g., basic or bronze level subscription type, enhanced or silver level subscription type, or premium or gold level subscription type), age range (e.g., 18-25, 26-35, or under 12), location (e.g., neighborhood, city, state, time zone), or any suitable combination thereof.

The impact factor may then be provided by the advertisement impact machine as a numerical score that corresponds to the advertiser's logo (e.g., to that specific presentation of the logo, where multiple presentations of the logo are present in the media content). Accordingly, the impact factor may be provided as a degree of effectiveness of an advertisement (e.g., a commercial or a product placement) that includes the logo within the media content. In some example embodiments, the advertisement impact machine may provide the impact factor to a broadcaster billing system. The broadcaster billing system may be configured to bill the advertiser for the presentation of the logo based on the impact factor. In certain example embodiments, the advertisement impact machine may provide the impact factor to an advertisement trading system. Such an advertisement trading system may be configured to offer ad insertion or ad replacement based on the impact factor. For example, the advertisement trading system may offer a replacement of an advertisement that includes the logo (e.g., a first advertisement) with another advertisement (e.g., second advertisement) that does not include the logo (e.g., an advertisement that includes a different logo of a different advertiser). Moreover, such an advertisement for a system may have advertised the offer in real-time (e.g., during a broadcast of the media content).

As used herein, "media content" refers to one or more data streams (e.g., tracks) of audio information (e.g., vocals or sounds), video information (e.g., pictures), textual information (e.g., text), metadata, or any suitable combination thereof, having a common database that enables a synchronized presentation of the data streams to a viewer of the media content. An example of media content is a television program (e.g., a television show). Further examples of media content include a movie, a sports event, a video-on-demand (VoD) presentation, a news program, a video streamed over a network (e.g., Internet streaming video), and an audio file streamed over network (e.g., Internet streaming audio or satellite radio). Media content may also be referred to as "program content."

Figure 2:
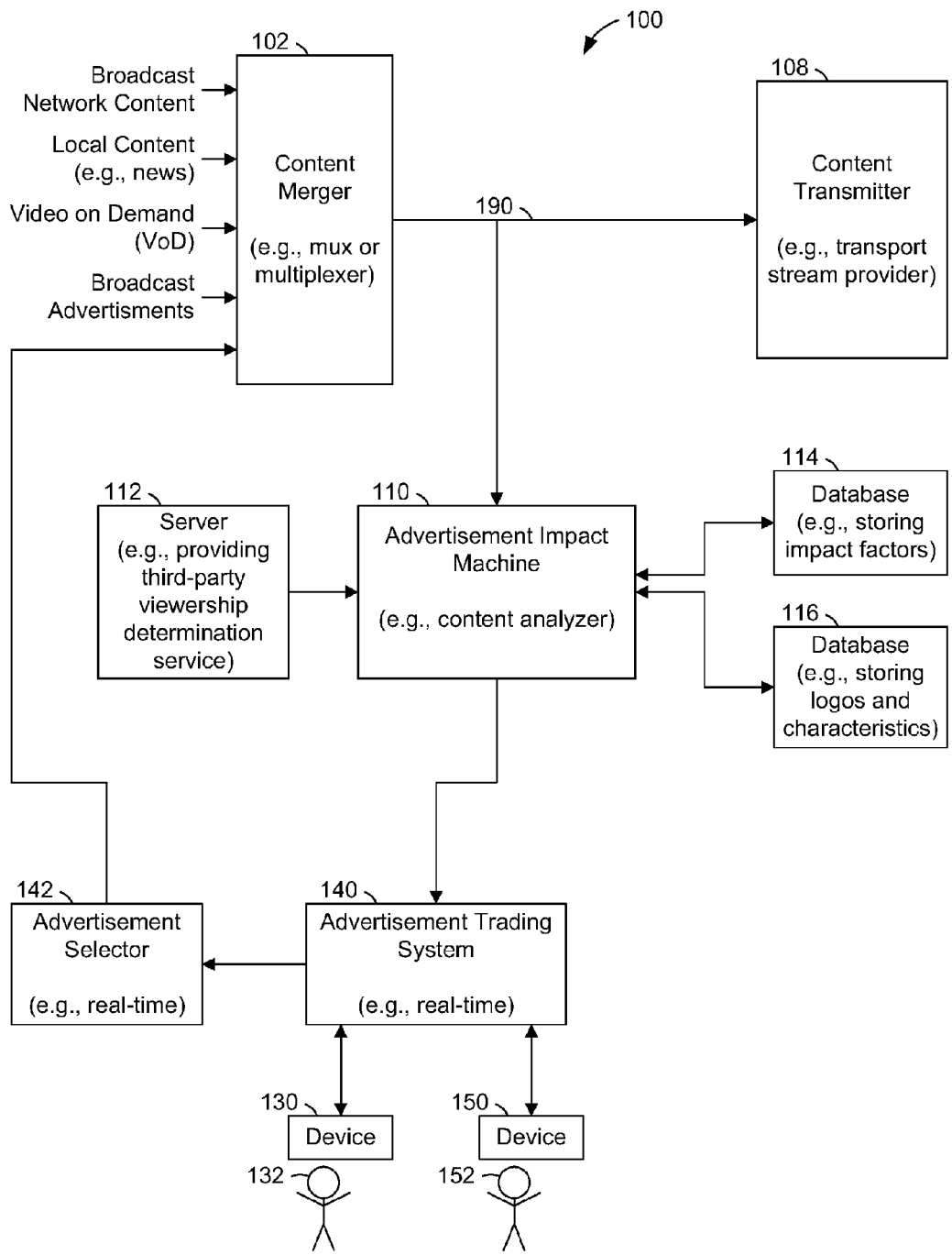

FIG. 1-2 are network diagrams illustrating a network environment 100 suitable for determination of advertisement impact, according to some example embodiments. As shown in FIG. 1, the network environment 100 may include a content merger 102, a content transmitter 108, an advertisement impact machine 110, a server 112, databases 114 and 116, a broadcaster billing system 120, and a device 130, all communicatively coupled as shown via a network 190. Moreover, the content merger 102, the content transmitter 108, the advertisement impact machine 110, the server 112, the databases 114 and 116, the broadcaster billing system 120, and the device 130 may each be implemented in a microchip or a computer system, in whole or in part, such as described below with respect to FIG. 9.

The content merger 102 is configured to merge multiple data streams (e.g., tracks) or programs (e.g., sets of synchronized tracks) into one or more transport streams. Accordingly, the content merger 102 may be referred to as a "multiplexer" or a "mux" that receives multiple input streams from multiple sources. As shown in FIG. 1, examples of such input streams include broadcast network content (e.g., movies, television shows, sports events, concerts, etc.), local content (e.g., local news), VoD programming, and broadcast advertisements (e.g., commercials). In some example embodiments, the content merger 102 receives one or more input streams in the form of digital packets. The content merger 102 merges the multiple data streams and outputs one or more data streams (e.g., as transport streams or elementary streams) to the content transmitter 108, to the advertisement impact machine 110, or to both.

The content transmitter 108 receives the output of the content merger 102 and transmits (e.g., broadcasts, in real-time or time delayed) this output via satellite communication, cable network communication, microwave communication, or any suitable combination thereof. This transmitted output may then be broadcast (e.g., rebroadcast) by one or more providers of cable television service, satellite television service, Internet television service, or any suitable combination thereof.

The advertisement impact machine 110 may be configured as a content analyzer that processes media content received from the content merger 102. The advertisement impact machine 110 may receive input from the content merger 102, the server 112, the database 114, the database 116, or any suitable combination thereof. For example, the advertisement impact machine 110 may access the media content that is output by the content merger 102, access a viewer count from the server 112, access a logo (e.g., characteristics of the logo) from the database 116, or any suitable combination thereof.

Furthermore, the advertisement impact machine 110 may provide output to the database 114, the broadcaster billing system 120, which may be configured as an invoice generator, or any suitable combination thereof. For example, the advertisement impact machine 110 may determine an impact factor for a presentation of a logo, based on the received inputs. This impact factor may be stored by the advertisement impact machine 110 in the database 114, provided by the advertisement impact machine 110 to the broadcaster billing system 120, or both. As shown, the broadcaster billing system 120 may communicate with the device 130, which may be a device of the user 132. In some example embodiments, the broadcaster billing system 120 may communicate directly (e.g., via the network 190) with the database 114.

The broadcaster billing system 120 may be configured as an invoice generator. Accordingly, the broadcaster billing system 120 may be configured to bill an advertiser (e.g., the advertiser whose logo is presented in the media content) for the presentation of the advertiser's logo within the media content. Moreover, the billing of the advertiser may be based on the impact factor received from the advertisement impact machine 110. In some example embodiments, the broadcaster billing system 120 is configured as a real time billing system that is capable of generating an invoice for the presentation of the logo during the presentation of the logo, during a broadcast of the media content, or both.

Also shown in FIG. 1 is a user 132, who may be an advertiser whose logo is depicted in the media content accessed from the content merger 102. The user 132 may be a human user (e.g., a human being), a machine user (e.g., a computer configured by software program to interact with the device 130), or any suitable combination thereof (e.g., a human assisted by a machine or a machine supervised by human). The user 132 is not part of the network 100, but is associated with the device 130 and may be a user of the device 130. For example, the device 130 may be a desktop computer, a vehicle computer, a tablet computer, a navigational device, a portable media device, or a smart phone belonging to the user 132.

The server 112 may be a server machine that is providing a viewership determination service (e.g., Nielsen ratings service, NetRatings service, TruMedia service, Quividi service, stickyPiXEL service, CognoVision service, or similar service). Furthermore, the server 112 may be operated by a third-party (e.g., with respect to the operator of the advertisement impact machine 110, the content merger 102, the content transmitter 108, the broadcaster billing system 120, or any suitable combination thereof). Accordingly, the server 112 may be configured to provide one or more viewer counts to the advertisement impact machine 110. As noted above, a viewer count may represent a numerical size of a group (e.g., plurality) of viewers of the media content. Furthermore, such a group may be a subset of all viewers of the media content. For example, the group may include only those viewers from a particular viewer profile (e.g., viewer classification), where the viewer profile characterizes the group as having a particular demographic attribute (e.g., with respect to the totality of all viewers of the media content). As examples, a viewer profile may characterize (e.g., classify or describe) a group of viewers as being male, female, subscribers of basic service (e.g., low-end subscription type), subscribers of enhanced service (e.g., mid-range subscription type), subscribers of premium service (e.g., high-end subscription type), or any suitable combination thereof. Accordingly, the server 112 may be configured to provide the advertisement impact machine 110 with a viewer profile that corresponds to a viewer count (e.g., 10,000 female viewers of the media content, or 25,000 basic subscribers viewing the media content). In some example embodiments, the viewer count for the media content may vary over the length of the media content (e.g., vary in time during a broadcast of the media content).

As shown in FIG. 2, the network environment 100 may include the content merger 102, the content transmitter 108, the advertisement impact machine 110, the server 112, and the databases 114 and 116, as discussed above with respect to FIG. 1. Furthermore, the network environment 100 may include an advertisement trading system 140, an advertisement selector 142, and devices 130 and 150 respectively associated with users 132 and 152, communicatively coupled as shown via the network 190. The content merger 102, the content transmitter 108, the advertisement impact machine 110, the server 112, the databases 114 and 116, the advertisement trading system 140, and the devices 130 and 150 may each be implemented in a computer system, in whole or in part, as described below with respect to FIG. 9.

The advertisement impact machine 110 may provide output to the database 114, the advertisement trading system 140, which may be configured to advertise advertiser replacement offers in real-time (e.g., during a broadcast of the media content), or any suitable combination thereof. For example, the advertisement impact machine 110 may determine an impact factor for a presentation of a logo, based on its received inputs. This impact factor may be stored by the advertisement impact machine 110 in the database 114, provided by the advertisement impact machine 110 to the advertisement trading system 140, or both. As shown, the advertisement trading system 140 may communicate with one or more of the devices 130 and 150.

The advertisement trading system 140 may be configured as a real-time trading platform for ad insertion, ad replacement, or both. Accordingly, the advertisement trading system 140 may be configured to offer a replacement of an advertisement within the media content (e.g., a first advertisement) with another advertisement (e.g., a second advertisement). Moreover, the making of the offer, the advertising of the offer, or both, may be based on the impact factor received from the advertisement impact machine 110. In some example embodiments, the advertisement trading system 140 is configured as a real time trading system that is configured to make the offer, advertise the offer, or both, during a broadcast of the media content (e.g., prior to the beginning of an advertisement that is subject to the offer for replacement). The advertisement trading system 140 may further receive an acceptance of the offer and accordingly initiate replacement of one advertisement with another advertisement. For example, the advertisement trading system 140 may provide an indication to the advertisement selector 142, where the indication causes the advertisement selector 142 to provide a replacement advertisement or a substitute advertisement (e.g., the second advertisement) to the content merger 102, along with metadata that contains instructions for the content merger 102 to merge the replacement advertisement (e.g., the second advertisement) instead of an advertisement being replaced (e.g., the first advertisement).

As shown in FIG. 2, the advertisement selector 142 may be configured to receive an indication from the advertisement trading system 140, and based on that indication, provide a replacement advertisement or a substitute advertisement to the content merger 102. This replacement or substitute advertisement may be provided along with metadata that contains instructions for the content merger 102 to perform ad replacement while merging data streams into a transport stream. Moreover, the advertisement selector 142 may be configured to operate in real-time (e.g., during a broadcast of the media content).

As noted above, the server 112 may be a server machine that is providing a viewership determination service. Moreover, the server 112 may be operated by a third-party (e.g., with respect to the operator of the advertisement impact machine 110, the content merger 102, the content transmitter 108, the broadcaster billing system 120, or any suitable combination thereof). Accordingly, the server 112 may be configured to provide one or more viewer counts to the advertisement impact machine 110. As also noted above, the server 112 may be configured to provide the advertisement impact machine 110 with a viewer profile that corresponds to a viewer count. Furthermore, the viewer count for the media content may be time-variant such that the viewer count for one portion of the media content is different from the viewer count for a different portion of the media content.

Also shown in FIG. 2 are users 132 and 152. One or both of the users 132 and 152 may be a human user, a machine user, or any suitable combination thereof (e.g., a human assisted by a machine or a machine supervised by a human). As noted above with respect to FIG. 1, the user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1-2 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a non-relational database, a triple store, a hierarchical data store, or any suitable combination thereof. Moreover, any two or more of the machines illustrated in FIG. 1-2 may be combined into a single machine, and the functions described herein for any single machine may be subdivided among multiple machines.

The network 190 may be any network that enables communication between machines (e.g., advertisement impact machine 110 and the broadcaster billing system 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 3:
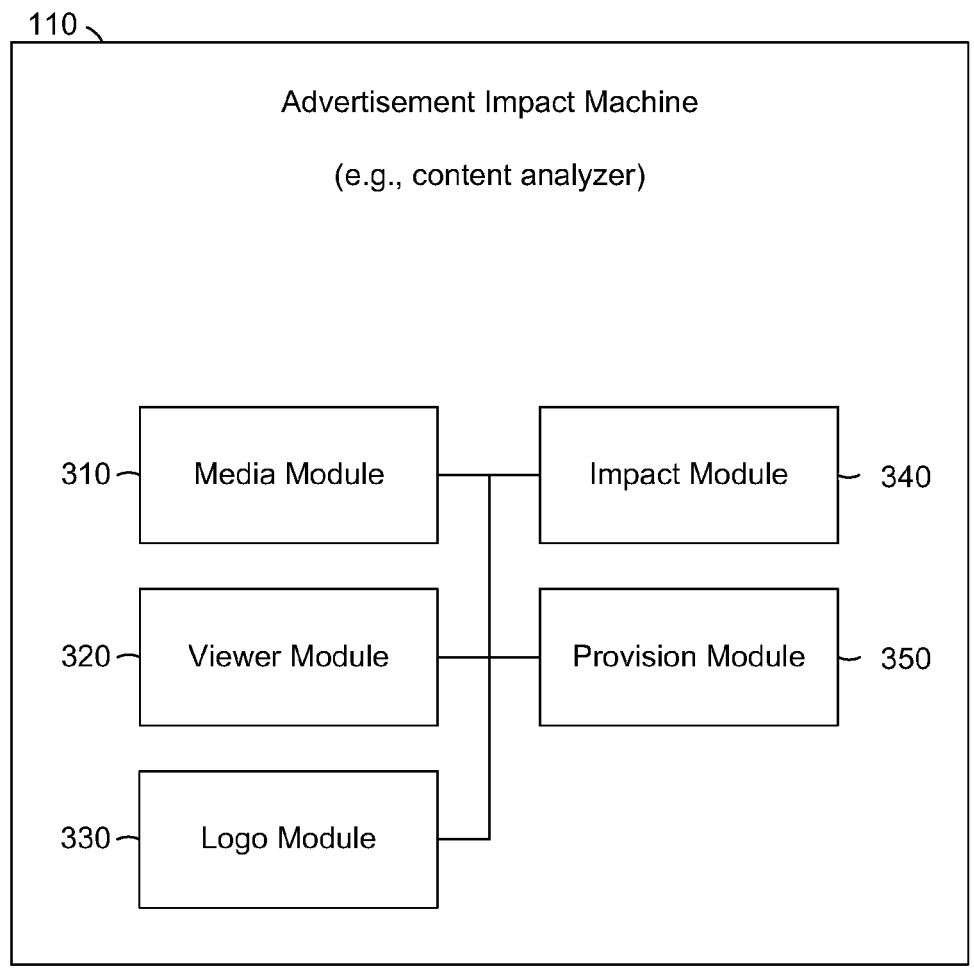
FIG. 3 is a block diagram illustrating components of an advertisement impact machine suitable for determination of advertisement impact, according to some example embodiments.

FIG. 3 is a block diagram illustrating components of the advertisement impact machine 110, according to some example embodiments. The advertisement impact machine 110 includes a media module 310, a viewer module 320, a logo module 330, an impact module 340, and a provision module 350, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

The media module 310 is configured (e.g., by software instructions) to access media content (e.g., from the content merger 102). The media content may include a frame (e.g., a first frame) within which a logo of an advertiser is depicted.

The viewer module 320 is configured to access a viewer count (e.g., from the server 112). As noted above, the viewer count may represent a numerical size of a group of viewers of the media content (e.g., all viewers of the media content, or a subset thereof).

The logo module 330 is configured to determine a duration of a presentation of the logo within the media content (e.g., accessed by the media module 310). For example, the logo module 330 may implement one or more image processing algorithms (e.g., a shape analysis algorithm) in determining the duration of the presentation. The logo module 330 may determine the duration by identifying the frame (e.g., the first frame) within which the logo of the advertiser is depicted, identifying another frame (e.g., a second frame) that is subsequent to that frame (e.g., the first frame) and devoid of the logo, and calculating the duration (e.g., in seconds or frames) based on the identified frames (e.g., the time codes of the identified frames).

The impact module 340 is configured to determine an impact factor. The impact factor may be determined based on the duration of the presentation of the logo (e.g., determined by the logo module 330) and the viewer count (e.g., accessed by the viewer module 320). For example, the impact factor may be determined based on a multiplication of the duration to the viewer count (e.g., impact factor=duration×viewer count). In some example embodiments, the multiplication involves multiplying together the duration, the viewer count, and a boost factor that quantifies increase in popularity of the media content (e.g., impact factor=duration×viewer count×boost factor). As noted above, the boost factor may correspond to an increase in the media content's popularity resulting from an event. In certain example embodiments, the multiplication involves multiplying together the duration, the viewer count, and a profile weight that corresponds to a viewer profile that corresponds to the viewer count (e.g., impact factor=duration×viewer count×profile weight). As noted above, the profile weight and the viewer profile may correspond to an attribute (e.g., a demographic attribute) of the group of viewers.

The provision module 350 is configured to provide the impact factor (e.g., determined by the impact module 340) to one or more machines, databases, or devices. The impact factor may be provided as a numerical score that corresponds to the logo of the advertiser (e.g., corresponds to a presentation of the advertiser's logo within the media content). For example, the provision module 350 may provide the impact factor to the database 114 (e.g., for storage), to the broadcaster billing system 120 (e.g., for generating invoice), to the advertisement trading system 140 (e.g., for making advertising an offer for replacement of the presentation of the logo with a different presentation of a different logo), or any suitable combination thereof. Further details of the modules in the advertisement impact machine 110 are described below with respect to FIG. 6-8.

Figure 4:
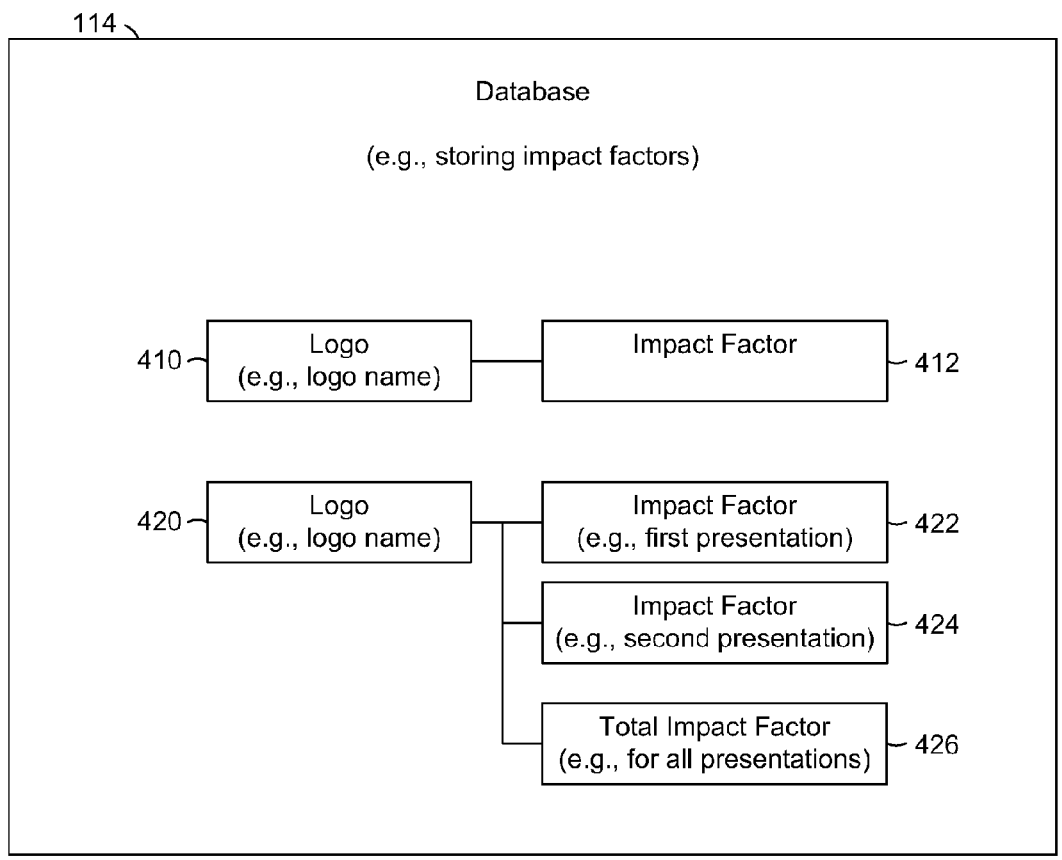
FIG. 4 is a block diagram illustrating a database with data structures capable of storing impact factors, according to some example embodiments.

FIG. 4 is a block diagram illustrating the database 114, according to some example embodiments. The database 114 may store one or more impact factors (e.g., in determined by the impact module 340 of the advertisement impact machine 110). As shown in FIG. 4, a logo 410 is stored with an impact factor 412 that corresponds to the logo 410. The logo 410 may be an image (e.g., with a corresponding animated movement, a corresponding sound, or both) that identifies the advertiser (e.g., as a company or business) or a product associated with the advertiser. Storage of the logo 410 may be performed by storing the logo 410 itself (e.g., an image of the logo 410) or an identifier (e.g., a logo name) for the logo 410. The impact factor 412 may be stored as a numerical score that represents a degree of effectiveness of an advertisement that includes the logo 410. In situations where the media content includes multiple presentations of the logo 410 (e.g., multiple advertisements in the form of commercials, product placements, or both), the logo 410 may correspond to multiple impact factors.

As shown in FIG. 4, a logo 420 is stored as corresponding to impact factors 422 and 424. The impact factor 422 may correspond to a first presentation of the logo 420 (e.g., calculated using a first viewer count), and the impact factor of 424 may correspond to a second presentation of the logo 420 (e.g., calculated using a second viewer count). Moreover, the logo 420 may be stored as corresponding to a total impact factor 426, which may be determined (e.g., by the impact module 340 of the advertisement impact machine 110) as an aggregate impact factor for multiple (e.g., two, five, or all) presentations of the logo 420 within the media content. For example, the total impact factor 426 may be an average of multiple impact factors or a summation of multiple impact factors (e.g., impact factors 422 and 424).

Figure 5:
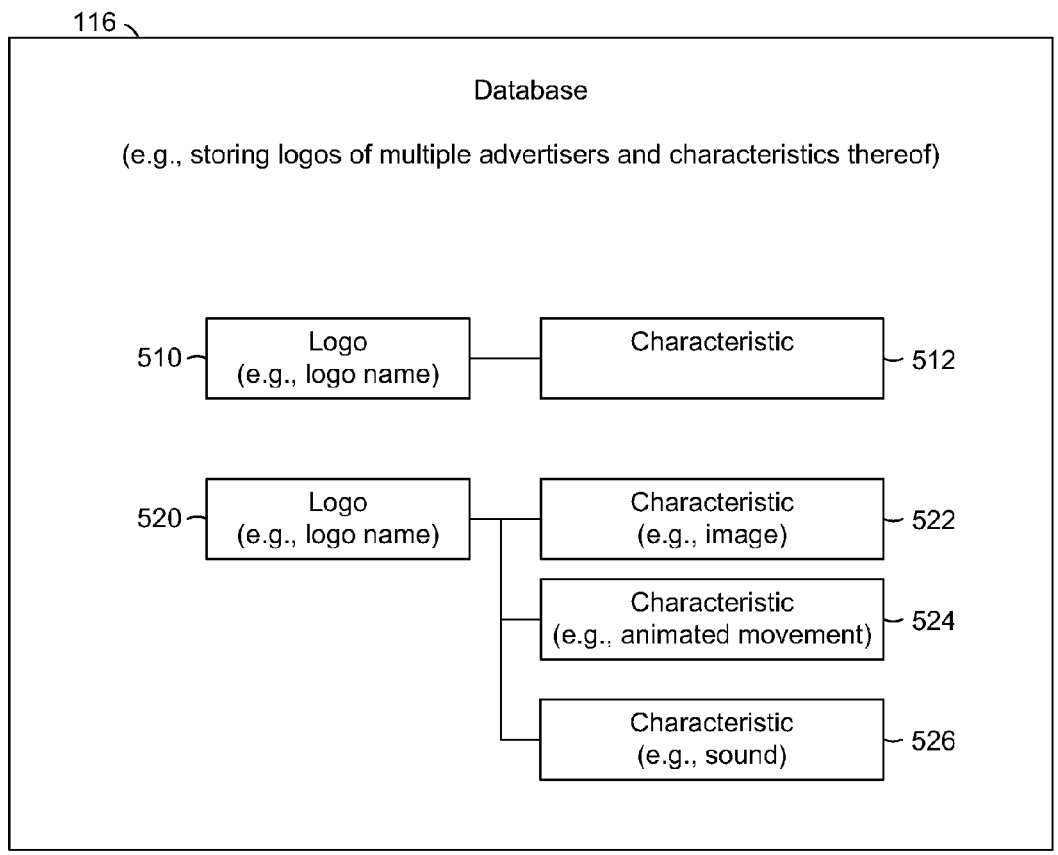
FIG. 5 is a block diagram illustrating a database with data structures capable of storing logos of multiple advertisers and characteristics of such logos, according to some example embodiments.

FIG. 5 is a block diagram illustrating the database 116, according to some example embodiments. The database 116 may store one or more logos (e.g., multiple logos of multiple advertisers). Moreover, the database 116 may store one or more characteristics of a logo. Examples of such characteristics include an image (e.g., an image file), an animated movement (e.g., a sequence of image files), a sound (e.g., an audio file), or any suitable combination thereof. Additional examples of characteristics include color, shape, size, text, and typeface (e.g., font).

As shown in FIG. 5, a logo 510 is stored with a characteristic 512 that corresponds to the logo 510. As indicated by its characteristics, the logo 510 may be an image (e.g., with a corresponding animated movement, a corresponding sound, or both) that identifies the advertiser (e.g., as a company or business) or a product associated with the advertiser. Storage of the logo 510 may be performed by storing the logo 510 itself (e.g., image of the logo 510) or an identifier (e.g., logo name) for the logo 510.

As shown in FIG. 5, a logo 520 has multiple characteristics 522, 524, and 526. The characteristic 522 may be an image of the logo 520. The characteristic 524 may be or define an animated movement that corresponds to the logo 520. For example, the characteristic 524 may be a list of image files (e.g., file names) or references (e.g., pointers or hyperlinks) to image files that define the animated movement for the logo 520. The characteristic 526 may be a sound (e.g., an audio clip, a spoken word, a musical jingle, a sound effects, or any suitable combination thereof) that corresponds to the logo 520.

Figure 6:
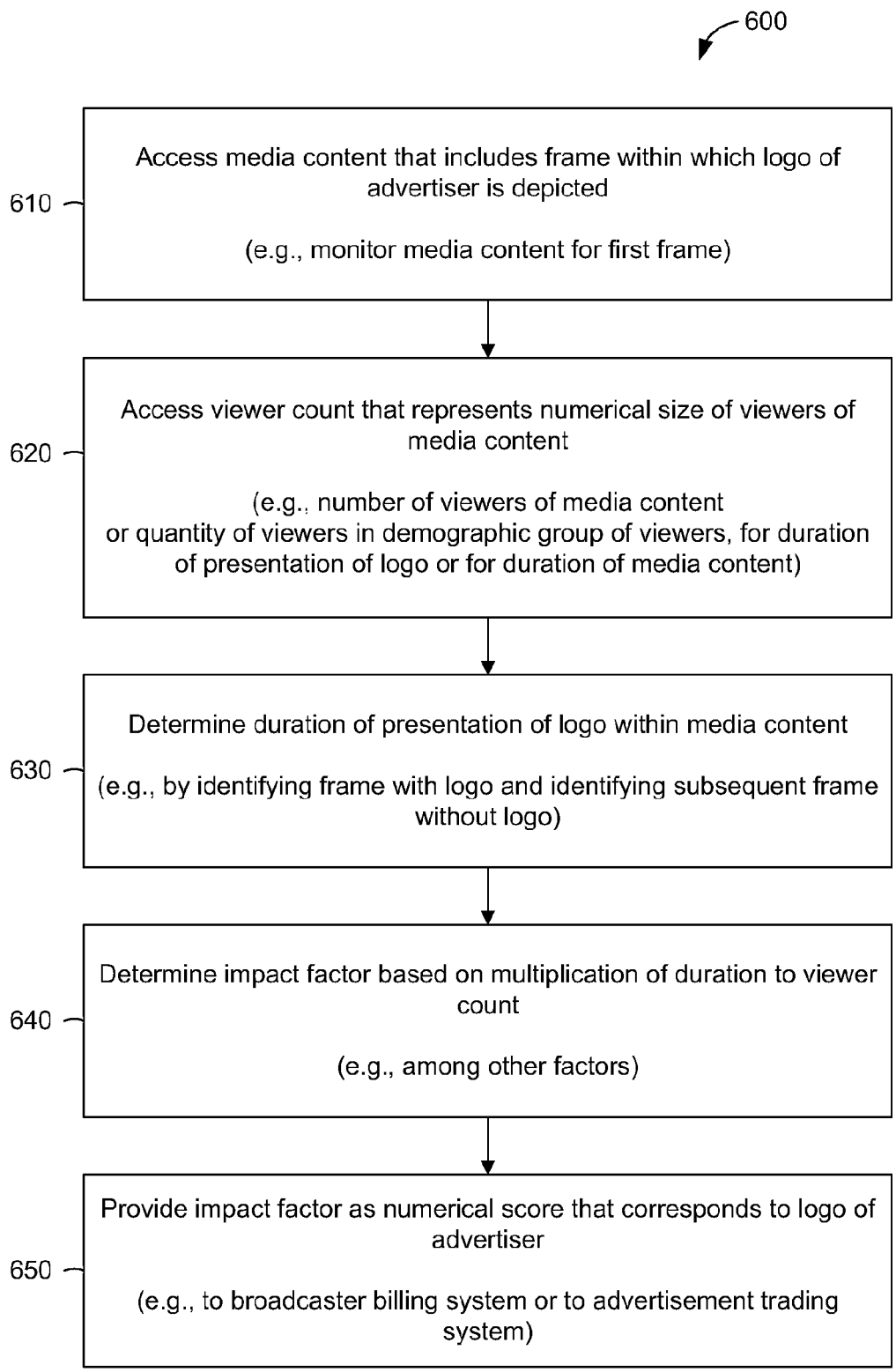
FIG. 6-8 are flowcharts illustrating operations of the advertisement impact machine in performing a method of determining advertisement impact, according to some example embodiments.
Figure 7:
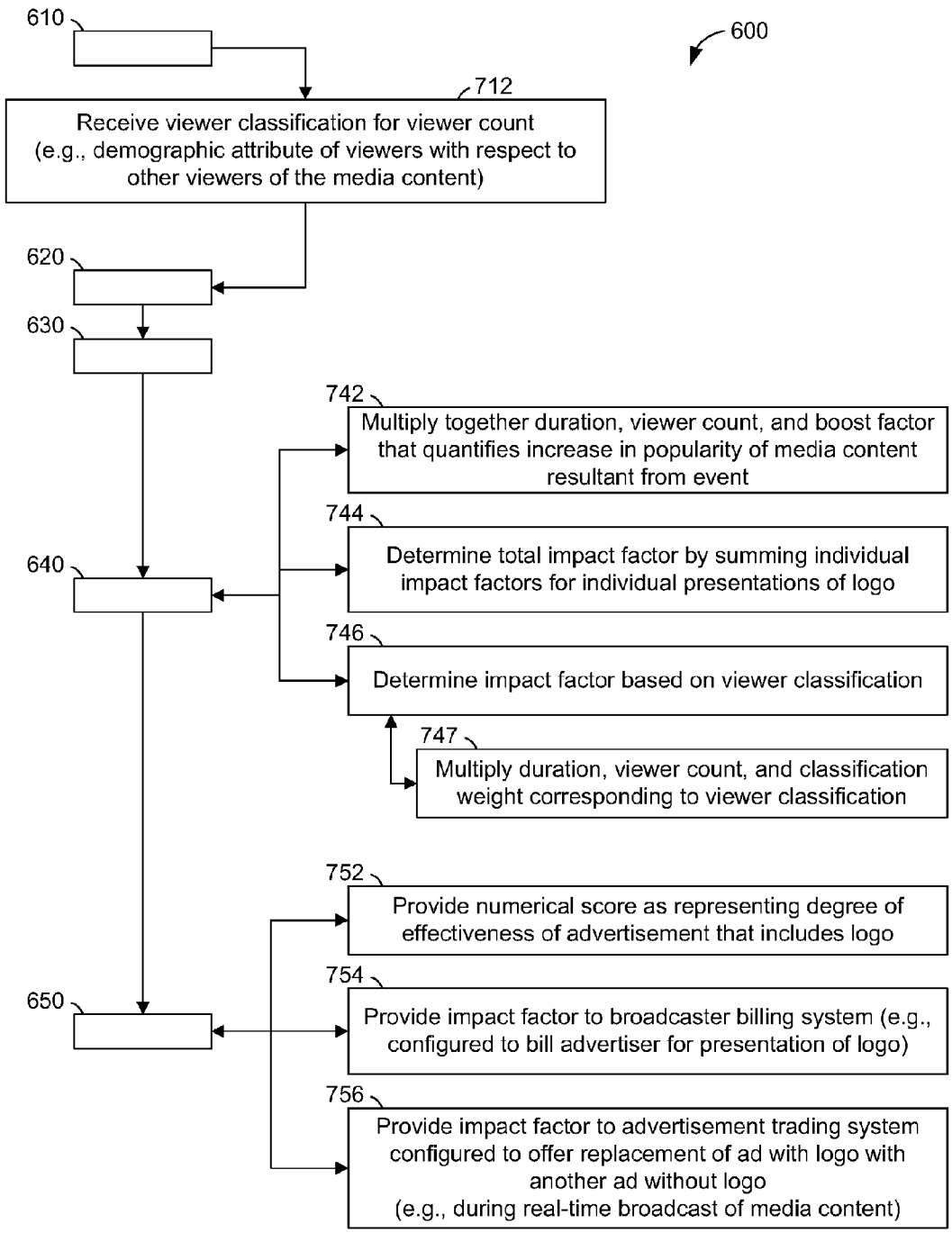
Figure 8:
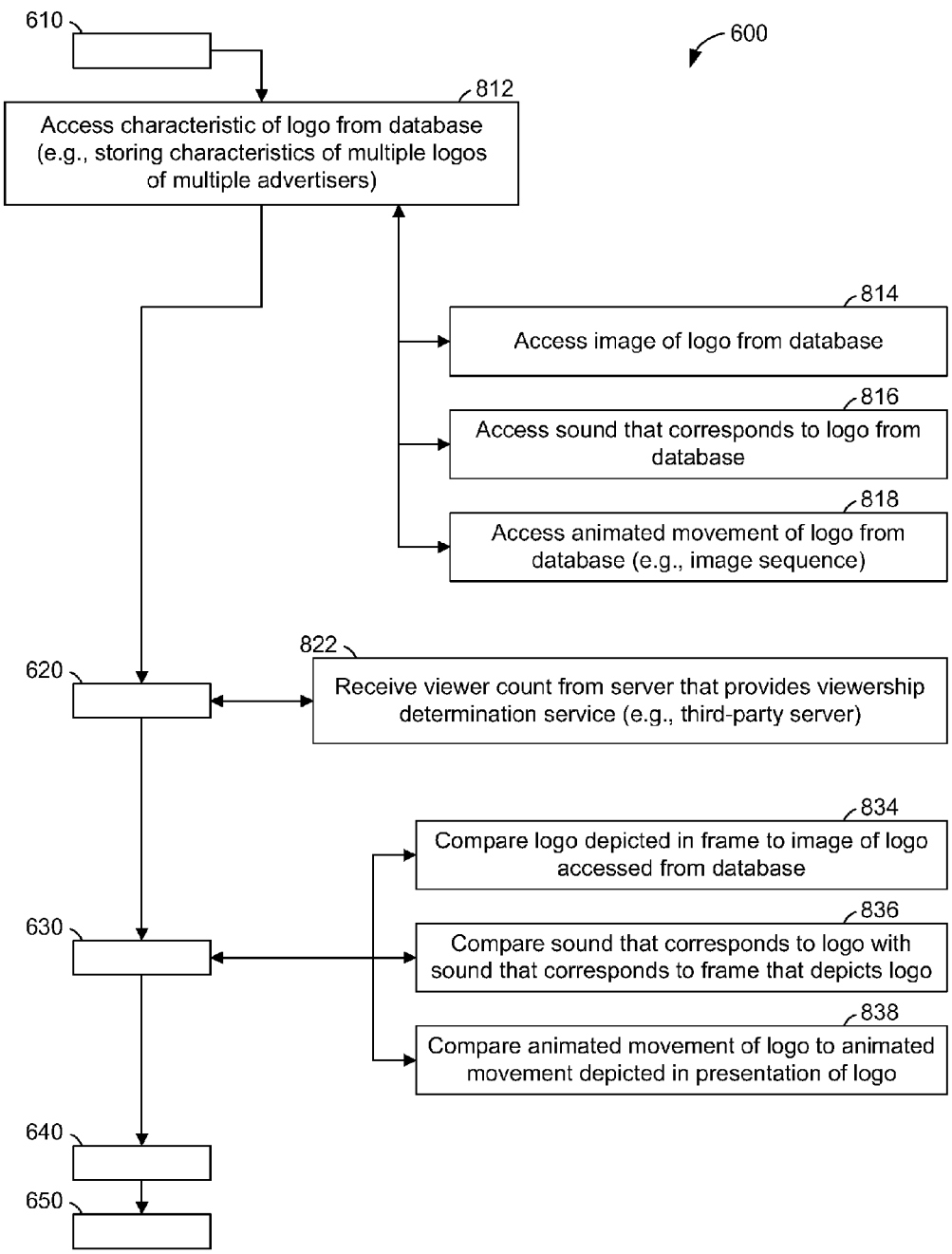

FIG. 6-8 are flowcharts illustrating operations of the advertisement impact machine 110 in performing a method 600 of determining advertisement impact, according to some example embodiments. Operations in the method 600 may be performed by the advertisement impact machine 110, using modules described above with respect to FIG. 3. As shown in FIG. 6, the method 600 may include operation 610, 620, 630, 640, and 650.

In operation 610, the media module 310 accesses media content (e.g., from the content merger 102) that includes a first frame within which a logo (e.g., logo 510) is depicted. According to various example embodiments, operation 610 may be performed while the content transmitter 108 is broadcasting the media content, or while the content transmitter 108 is storing (e.g., buffering) the media content for later broadcast. In some example embodiments, the first frame is a keyframe (e.g., an I-frame) that contains information defining all pixels of the first frame. In alternative example embodiments, the first frame is a predicted frame (e.g., a P-frame) or a bidirectional frame (e.g., a B-frame) that contains information defining a portion of the pixels of a keyframe (e.g., an I-frame).

In operation 620, the viewer module 320 accesses a viewer count (e.g., from the server 112) that represents a numerical size of a group of viewers of the media content accessed in operation 610. As noted above, the viewer count may correspond to a viewer profile that characterizes each of the group of viewers as having an attribute (e.g., a demographic attribute). According to various example embodiments, a group of viewers of the media content (e.g., a group having a particular demographic attribute or the set of all viewers of the media content) may vary in size over time during a broadcast of the media content. For example, if the media content is a sports event, the number of viewers may increase toward the end of the sports event. As noted above, the viewer count may represent the numerical size of the group of viewers. Accordingly, the viewer count may represent the numerical size (e.g., instantaneous numerical size) of the group of viewers during a portion of the media content. As an example, the viewer count may represent the numerical size of the group during the presentation of the logo (e.g., during an advertisement that depicts the logo).

In addition, the viewer count may represent the numerical size of a group that includes viewers using multiple platforms (e.g., a combination of viewers using television sets and viewers using Internet browsers or streaming media players). Accordingly, an impact factor calculated from such a viewer count may represent a cross-platform assessment of advertisement impact. Similarly, the viewer count may represent the numerical size of a group that includes viewers that viewed the media content at different times (e.g., a combination of viewers who viewed the media content live and viewers who viewed the media content as a time-shifted or delayed recording). Accordingly, an impact factor calculated from such a viewer count may represent a time-independent assessment of advertisement impact.

In operation 630, the logo module 330 determines a duration of the presentation of the logo (e.g., logo 510) within the media content accessed in operation 610. For example, the logo module 330 may identify the first frame discussed above with respect to operation 610 (e.g., the frame in which the logo is first depicted). This first frame may indicate the beginning of the presentation of the logo within the media content. Moreover, the logo module 330 may identify a second frame that is subsequent to the first frame and devoid of the logo (e.g., the next frame in the media content within which the logo is absent). Accordingly, the logo module 330 may identify a third frame that immediately precedes the second frame. This third frame may indicate the ending of the presentation of the logo within the media content. Accordingly, the logo module 330 may determine the duration of the presentation based on the first frame (e.g., a timecode of the first frame) and the third frame (e.g., a timecode of the third frame). In some example embodiments, the logo module 330 determines the duration the presentation based on the first frame and the second frame (e.g., a timecode of the second frame).

In operation 640, the impact module 340 determines an impact factor. The impact factor may be determined based on a multiplication of the duration (e.g., determined in operation 630) to the viewer count (e.g., accessed in operation 620). For example, the impact module 340 may multiply together the duration and the viewer count. According to various example embodiments, the impact module 340 may perform operation 640 by multiplying together the duration, the viewer count, and one or more additional factors (e.g., a boost factor, a profile weight, or both). The impact factor (e.g., impact factor 412) may be the product of this multiplication. According to various example embodiments, such additional factors may include weighting factors that represent time of day (e.g., lunchtime, evening, or late night), geographic area, purchasing power, or visibility of the logo within the media content (e.g., partial concealment or difficulty for viewers in seeing the logo). In some example embodiments, the impact factor is determined based on a logarithm of the duration, a logarithm of the viewer count, or both. For example, the impact factor may be determined as a sum of a logarithm of the duration and a logarithm of the viewer count.

In operation 650, the provision module 350 provides the impact factor (e.g., determined in operation 640) to one or more machines, systems, databases, or devices. For example, the provision module 350 may provide the impact factor to a broadcaster billing system 120, the advertiser trading system 140, the database 114, or any suitable combination thereof.

As shown in FIG. 7, the method 600 may include one or more of operations 712, 742, 744, 746, 747, 752, 754, and 756. Operation 712 may be performed as shown after operation 610. In other example embodiments, operation 712 may be performed after operation 620 or after operation 630. In operation 712, the viewer module 320 receives a viewer profile that corresponds to the viewer count received in operation 620. As noted above, the viewer profile may characterize each viewer in a group of viewers of the media content. In particular, the viewer profile may characterize the group of viewers as having a demographic attribute with respect to a larger group of viewers (e.g., all viewers of the media content). As noted above, examples of a demographic attribute include a gender (e.g., male or female) and a subscription type (e.g., basic, enhanced, premium, bronze level, silver level, or gold level).

In example embodiments that include operation 712, operation 746 may be performed as part (e.g., a precursor task, a subroutine, or a portion) of operation 640, in which the impact module 340 determines the impact factor based on a multiplication of the duration (e.g., determined in operation 630) to the viewer count (e.g., accessed in operation 620). In operation 746, the impact module 340 determines the impact factor based on the duration, the viewer count, and the viewer profile received in operation 712. Operation 747 may be performed as part of operation 746. In operation 747, the impact module 340 performs the multiplication by multiplying together the duration, the viewer count, and the profile weight. In some example embodiments, the impact factor (e.g., impact factor 412) is the product of this multiplication.

According to various example embodiments, one or more of operations 742 and 744 may be performed as part of operation 640, in which the impact module 340 determines the impact factor based on the multiplication of the duration to the viewer count. In operation 742, the impact module 340 determines the impact factor based on the duration, the viewer count, and a boost factor that quantifies an increase in popularity of the media content resulting from an event. For example, the impact module 340 may perform the multiplication by multiplying together the duration, the viewer count, and the boost factor. In some example embodiments, the impact factor (e.g., impact factor 412) is the product of this multiplication. The boost factor may be accessed from a third-party source (e.g., server 112), for example, as an input provided by a third-party viewership determination service.

In operation 744, the impact module 340 determines a total impact factor (e.g., impact factor 426) that corresponds to the logo (e.g., logo 420) presented in the media content accessed in operation 610. As noted above, the total impact factor may be determined by summing multiple impact factors (e.g., impact factors 422 and 424) corresponding to individual presentations of the logo within the media content (e.g., distinct advertisements that depict the logo). Each of these multiple impact factors may be determined as discussed above for each individual presentation of the logo (e.g., as a product from a multiplication of a duration to a viewer count).

According to various example embodiments, one or more of operations 752, 754, and 756 may be performed as part of operation 650, in which the provision module 350 provides the impact factor (e.g., determined in operation 640). In operation 752, the provision module 350 provides the impact factor as a numerical score that represents a degree of effectiveness of an advertisement that includes the logo (e.g., logo 510) within the media content accessed in operation 610.

In operation 754, the provision module 350 provides the impact factor to the broadcaster billing system 120. As noted above, the broadcaster billing system 120 may be configured to bill the advertiser for the presentation of the advertiser's logo within the media content accessed in operation 610. This billing of the advertiser may be performed based on the impact factor.

In operation 756, the provision module 350 provides the impact factor to the advertisement trading system 140. As noted above, the advertisement trading system 140 may be configured to offer a replacement of a first advertisement within the media content (e.g., an advertisement that includes the logo corresponding to the impact factor) with a second advertisement (e.g., an advertisement that includes a different logo). The offering of this replacement may be performed based on the impact factor. Moreover, as noted above, the advertisement trading system 140 may be configured to operate in real-time (e.g., during a broadcast of the media content), and operation 756 may be accordingly performed in real-time (e.g., during the broadcast of the media content). In some example embodiments, the offering of the replacement may be performed based on one or more additional factors (e.g., a preference of one advertiser to advertise with another advertiser, or a preference of one advertiser to avoid advertising with another advertiser).

As shown in FIG. 8, the method 600 may include one or more of operations 812, 814, 816, 818, 822, 834, 836, and 838. Operation 812 may be performed as shown after operation 610. In other example embodiments, operation 812 may be performed after operation 620. In operation 812, the logo module 330 accesses a characteristic (e.g., characteristic 512) of the logo (e.g., logo 510) depicted in the media content accessed in operation 610. This characteristic may be accessed from the database 116.

One or more of operations 814, 816, and 818 may be performed as part of operation 812. In operation 814, the logo module 330 accesses the characteristic (e.g., characteristic 522) by accessing an image of the logo from the database 116. In example embodiments that include operation 814, the method 600 may include operation 834, in which the logo module 330, in the process of performing operation 630, compares the logo depicted in the first frame to the image of the logo accessed from the database 116. This may have the effect of fully or partially identifying the first frame as a frame within which the logo is depicted (e.g., by identifying a match between the appearance of the logo in the media content and the image of the logo accessed from the database 116).

In operation 816, the logo module 330 accesses the characteristic (e.g., characteristic 526) by accessing a sound that corresponds to the logo from the database 116. In example embodiments that include operation 816, the method 600 may include operation 836, in which the logo module 330, in the process of performing operation 630, compares the sound that corresponds to the logo with a sound that corresponds to the first frame within the media content. This may have the effect of fully or partially identifying the first frame as a frame within which the logo is depicted. For example, the first frame may be identified by identifying a match between the sound for the logo in the media content and the sound accessed from the database 116. In certain example embodiments, such a match is identified by the logo module 330 when a detection algorithm exceeds a predefined threshold for closeness of the match.

In operation 818, the logo module 330 accesses the characteristic (e.g., characteristic 524) by accessing an animated movement (e.g., a sequence of images) from the database 116. In example embodiments that include operation 818, the method 600 may include operation 838, in which the logo module 330, in the process of performing operation 630, compares an animated movement depicted in the presentation of the logo within the media content to the animated movement accessed from the database 116. This may have the effect of fully or partially identifying the first frame as a frame within which the logo is depicted. For example, the first frame may be identified by identifying a match between the motion of the logo in the media content and the animated movement accessed from the database 116. In some example embodiments, such a match is identified by the logo module 330 when a detection algorithm exceeds a predefined threshold for closeness of the match.

Operation 822 may be performed as part of operation 620, in which the viewer module 320 accesses the viewer count. In operation 822, the viewer module 320 receives the viewer count from the server 112. As noted above, the server 112 may provide one or more viewership determination services, and the server 112 may be operated by a third party as a third-party server.

According to various example embodiments, one or more of the methodologies described herein may facilitate determination of advertisement impact by quantifying an impact factor for a presentation of a visual object (e.g., a logo) within media content. Moreover, one or more of the methodologies described herein may facilitate generation of invoices for advertisements that are included in media content. Furthermore, one or more the methodologies described herein may facilitate replacement of advertisements as facilitated by an advertisement trading system. Hence, one or more the methodologies described herein may facilitate efficient selection of advertisements and efficient billing for advertisements by basing the selection and billing of advertisements on the quantified impact of these advertisements.

When these effects are considered in aggregate, one or more of the methodologies described herein may obviate a need for certain efforts or resources that otherwise would be involved in assessing the impact of advertisements in media content, billing for advertisements in the content, and selecting replacement advertisements. Efforts expended by a content provider in performing these tasks may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
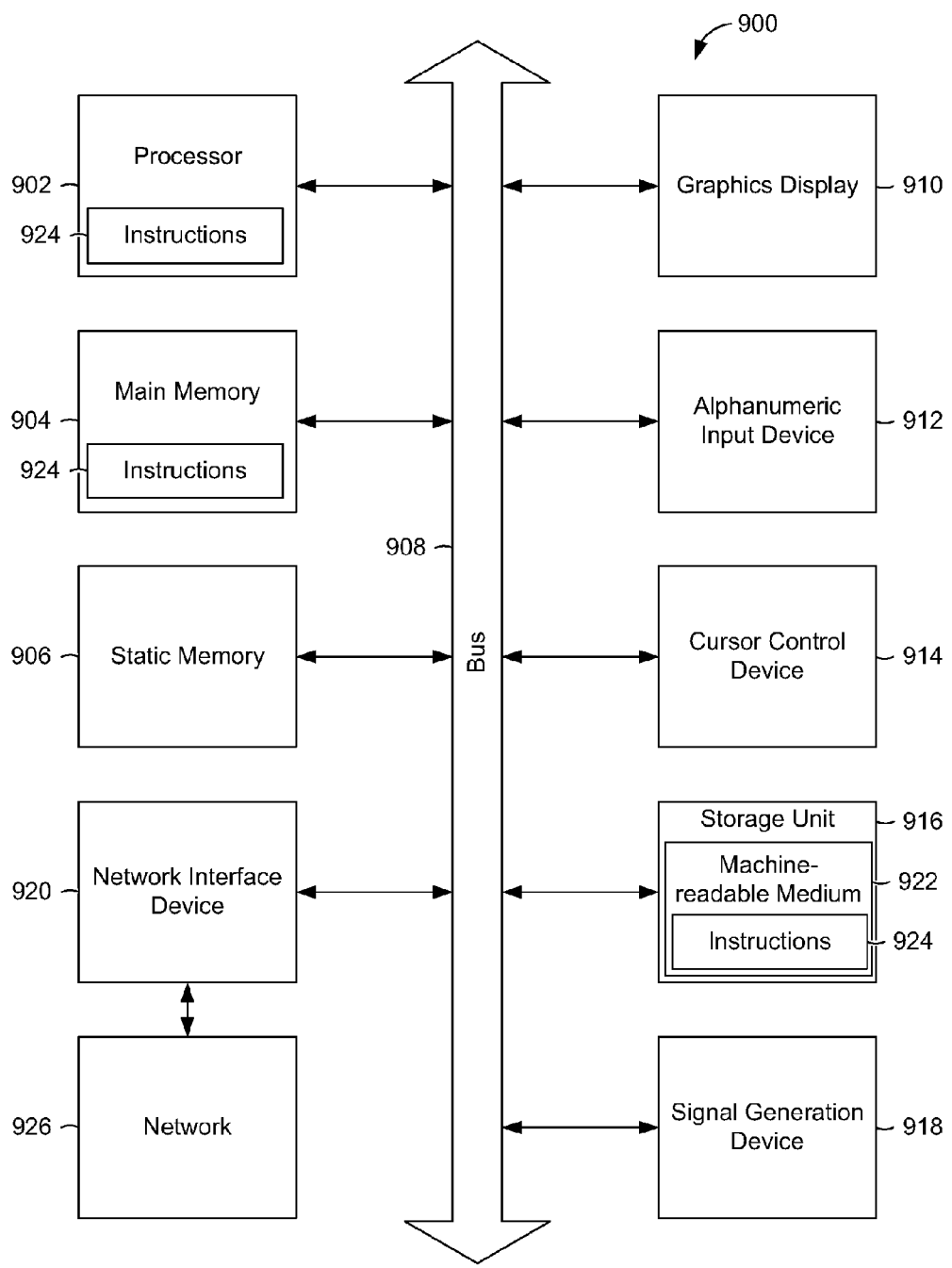
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing, by one or more processors of a content analysis machine, a datastream of media content of which a portion is uninterrupted by commercials and includes a frame within which a visual object that corresponds to an advertiser is depicted, an image of the visual object being stored in a database with data describing a corresponding characteristic of the visual object, the media content being accessed from a content merger machine communicatively coupled to the content analysis machine via a network;
accessing, by the one or more processors of the content analysis machine, a viewer count that represents a plurality of viewers of the portion of the media content, the viewer count being accessed from a server machine that is providing a viewership determination service and communicatively coupled to the content analysis machine via the network;
determining, by the one or more processors of the content analysis machine, a duration during which the visual object is presented within the portion of the media content by comparing the stored data that describes the characteristic of the visual object to the portion of the media content;
accessing, by the one or more processors of the content analysis machine, a boost factor from the server machine that is providing the viewership determination service, the boost factor quantifying an increase in popularity of the media content in which the portion is uninterrupted by commercials and includes the frame in which the visual object is depicted;
determining, by the one or more processors of the content analysis machine, an impact factor based on multiplying together: the determined duration during which the visual object appears in the portion of the media content, the accessed viewer count, and the accessed boost factor that quantifies the increase in popularity of the media content in which the portion is uninterrupted by commercials and includes the frame in which the visual object is depicted; and
controlling, by the one or more processors of the content analysis machine, a system communicatively coupled to the content analysis machine via the network by providing the determined impact factor to the system, the provided impact factor being a basis on which the system generates and provides a communication to the advertiser that corresponds to the visual object.

2. The method of claim 1, wherein:
the determining of the duration includes identifying the frame within which the visual object is depicted and identifying a further frame that is subsequent to the frame and devoid of the visual object.

3. The method of claim 1, wherein:
the visual object depicted within the frame is a logo that identifies at least one of the advertiser, a product of the advertiser, or a service of the advertiser.

4. The method of claim 1, wherein:
the providing of the impact factor includes providing the impact factor to a broadcaster billing system configured to bill the advertiser for a presentation of the visual object based on the impact factor.

5. The method of claim 1, wherein:
the plurality of viewers of the media content varies in size during a broadcast of the media content; and
the viewer count represents a numerical size of the plurality of viewers of the media content during a presentation of the visual object within the media content.

6. The method of claim 5, wherein:
the determining of the impact factor is part of determining a total impact factor by summing a first product of multiplying the duration to the viewer count with a second product of multiplying a further duration during which the visual object is presented within the media content to a further viewer count that represents a further quantity of viewers of the media content during a further presentation of the visual object within the media content.

7. The method of claim 1 further comprising:
receiving a viewer profile that corresponds to the viewer count and that characterizes each of the plurality of viewers as having an attribute with respect to a further plurality of viewers of which the plurality of viewers is a subset; and wherein
the determining of the impact factor is further based on the viewer profile that characterizes each of the plurality of viewers as having the attribute with respect to the further plurality of viewers.

8. The method of claim 7, wherein:
the determining of the impact factor includes multiplying together the duration, the viewer count, and a viewer profile weight that corresponds to the viewer profile.

9. The method of claim 7, wherein:
the viewer profile indicates the attribute as at least one of a gender of the plurality of viewers or a subscription type of the plurality of viewers.

10. The method of claim 1, further comprising:
accessing the image of the visual object from the database; and
the determining of the duration includes identifying the frame by comparing the visual object depicted in the frame to the image of the visual object accessed from the database.

11. The method of claim 1, further comprising:
accessing a sound that corresponds to the visual object from the database; and
the determining of the duration includes identifying the frame by comparing the sound that corresponds to the visual object to a further sound that corresponds to the first frame within the portion of the media content.

12. The method of claim 1, further comprising:
accessing an animated movement of the visual object from the database; and
the determining of the duration includes identifying the frame by comparing the animated movement of the visual object to a further animated movement of the visual object depicted within the portion of the media content.

13. A non-transitory machine-readable storage medium comprising instructions that, when executed by one or more processors of a content analysis machine, cause the content analysis machine to perform operations comprising:
accessing a datastream of media content of which a portion is uninterrupted by commercials and includes a frame within which a visual object that corresponds to an advertiser is depicted, an image of the visual object being stored in a database with data describing a corresponding characteristic of the visual object, the media content being accessed from a content merger machine communicatively coupled to the content analysis machine via a network;
accessing a viewer count that represents a plurality of viewers of the portion of the media content, the viewer count being accessed from a server machine that is providing a viewership determination service and communicatively coupled to the content analysis machine via the network;
determining a duration during which the visual object is presented within the portion of the media content by comparing the stored data that describes the characteristic of the visual object to the portion of the media content;
accessing a boost factor from the server machine that is providing the viewership determination service, the boost factor quantifying an increase in popularity of the media content in which the portion is uninterrupted by commercials and includes the frame in which the visual object is depicted;
determining an impact factor based on multiplying together: the determined duration during which the visual object appears in the portion of the media content, the accessed viewer count, and the accessed boost factor that quantifies the increase in popularity of the media content in which the portion is uninterrupted by commercials and includes the frame in which the visual object is depicted; and
controlling a system communicatively coupled to the content analysis machine via the network by providing the determined impact factor to the system, the provided impact factor being a basis on which the system generates and provides a communication to the advertiser that corresponds to the visual object.

14. The non-transitory machine-readable storage medium of claim 13, wherein:
the providing of the impact factor includes providing the impact factor to a broadcaster billing system configured to bill the advertiser for a presentation of the visual object based on the impact factor.

15. A content analysis machine comprising:
one or more processors;
a memory storing instructions that, when executed by the one or more processors, cause the content analysis machine to perform operations comprising:
accessing a datastream of media content of which a portion is uninterrupted by commercials and includes a frame within which a visual object that corresponds to an advertiser is depicted, an image of the visual object being stored in a database with data describing a corresponding characteristic of the visual object, the media content being accessed from a content merger machine communicatively coupled to the content analysis machine via a network;
accessing a viewer count that represents a plurality of viewers of the portion of the media content, the viewer count being accessed from a server machine that is providing a viewership determination service and communicatively coupled to the content analysis machine via the network;
determining a duration during which the visual object is presented within the portion of the media content by comparing the stored data that describes the characteristic of the visual object to the portion of the media content;
accessing a boost factor from the server machine that is providing the viewership determination service, the boost factor quantifying an increase in popularity of the media content in which the portion is uninterrupted by commercials and includes the frame in which the visual object is depicted;
determining an impact factor based on multiplying together: the determined duration during which the visual object appears in the portion of the media content, the accessed viewer count, and the accessed boost factor that quantifies the increase in popularity of the media content in which the portion is uninterrupted by commercials and includes the frame in which the visual object is depicted; and
controlling a system communicatively coupled to the content analysis machine via the network by providing the determined impact factor to the system, the provided impact factor being a basis on which the system generates and provides a communication to the advertiser that corresponds to the visual object.

* * * * *